United States Patent [19]
Fix, Jr.

[11] Patent Number: 5,785,805
[45] Date of Patent: Jul. 28, 1998

[54] FRICTION WELDING FUSION ENHANCER APPARATUS

[76] Inventor: John William Fix, Jr., P.O. Box 1847, Palm City, Fla. 34991

[21] Appl. No.: 870,974

[22] Filed: Jun. 6, 1997

Related U.S. Application Data

[60] Provisional application No. 60/019,922 Jun. 14, 1996.

[51] Int. Cl.$^6$ .................................................. B23K 20/12
[52] U.S. Cl. .................... 156/580; 156/73.5; 228/2.3; 228/114.5
[58] Field of Search .................... 156/73.5, 580; 228/2.1, 2.3, 112.1, 114.5; 264/68

[56] References Cited

U.S. PATENT DOCUMENTS

| | | | |
|---|---|---|---|
| 3,444,611 | 5/1969 | Bogart | 29/470.3 |
| 3,452,914 | 7/1969 | Oberle et al. | 228/2.1 |
| 3,504,425 | 4/1970 | Sutovsky et al. | 29/470.3 |
| 3,576,067 | 4/1971 | Loyd et al. | 29/470.3 |
| 3,609,854 | 10/1971 | Hasui | 29/470.3 |
| 3,678,566 | 7/1972 | Ellis et al. | 29/470.3 |
| 3,680,760 | 8/1972 | Costa et al. | 228/2.3 |
| 3,694,896 | 10/1972 | Loyd | 29/470.3 |
| 3,777,360 | 12/1973 | Welch | 29/470.3 |
| 3,827,138 | 8/1974 | Needham et al. | 29/470.3 |
| 3,853,258 | 12/1974 | Louw et al. | 228/2.1 |
| 3,973,715 | 8/1976 | Rust | 228/112.1 |
| 4,058,421 | 11/1977 | Summo | 156/73.5 |
| 4,063,676 | 12/1977 | Lilly | 228/114 |
| 4,067,490 | 1/1978 | Jones et al. | 228/102 |
| 4,850,772 | 7/1989 | Jenkins | 411/171 |
| 5,054,980 | 10/1991 | Bidefeld | 411/171 |
| 5,558,265 | 9/1996 | Fix, Jr. | 228/2.3 |
| 5,699,952 | 12/1997 | Fix, Jr. | 228/102 |

OTHER PUBLICATIONS

Welding Handbook, Eighth Edition, vol. I, Welding Technology; American Welding Society, 1987, pp. 19-20, 41, 547-548.

Welding Handbook, Eighth Edition, vol. II, Welding Processes, American Welding Socity, 1991, pp. 740-761.

*Primary Examiner*—James Sells
*Attorney, Agent, or Firm*—Sankey & Luck, L.L.P.

[57] ABSTRACT

A friction welding fusion enhancer apparatus. This invention relates generally to an apparatus and method for increasing the fusion area of a rotatable workpiece (stud, shaft or other) to be friction welded to a substrate of either similar or dissimilar materials or two circular shafts that are to be friction welded together by use of an apparatus that can be removable from the stud, shaft or other weldable devices after the stud is friction welded to the substrate, while limiting the build-up of plastisized matter around the peripheral edge of the rotatable workpiece. It is envisioned the invention disclosed herein could be adaptable to a wide range of friction welding apparatuses since the apparatus disclosed herein could be adapted to most friction welder rotatable workpieces. The friction welding fusion enhancer apparatus includes the following integrally coupled components: reaction surface area, peripheral edge, engagement means and rotatable workpiece.

18 Claims, 9 Drawing Sheets

FRICTION WELDING FUSION ENHANCER APPARATUS

REFERENCE TO PROVISIONAL APPLICATION

Pursuant to 35 U.S.C. § 119(e), this application derives from a provisional application for the same invention filed on Jun. 14, 1996, provisional Ser. No. 60/019,922.

BACKGROUND OF THE INVENTION

1. Field of the Invention

This invention relates generally to an apparatus and method for increasing the fusion area of a rotatable workpiece (stud, shaft or other) to be friction welded to a substrate of either similar or dissimilar materials or two circular shafts that are to be friction welded together by use of an apparatus that can be removable from the stud, shaft or other weldable devices after the stud is friction welded to the substrate, while limiting the build-up of plastisized matter around the peripheral of the rotatable workpiece. Friction welding, in general, is covered by prior art and it is envisioned the invention disclosed herein could be adaptable to a wide range of friction welding apparatuses since the apparatus disclosed herein could be adapted to most friction welder rotatable workpieces. This invention specifically relates to a friction welding fusion enhancer apparatus which can be utilized with a wide range of friction welder apparatuses, and methods for its use, although not limited to the geometric configurations provided herein.

2. Description of the Prior Art

The joining of materials to form a strong cohesive, high strength, fine grain weld bond is common to industry throughout the world. It is commonly achieved by arc welding, o-xyfule gas welding, flash welding, brazing, soldering, electron beam welding, laser beam welding and other techniques where open flame does not present an explosive hazard. In most cases, the exposed flame or arc creates no hazard and is practical to use. In areas where combustible gases are present, it is not usually possible to use an open flame or arc welding procedure, due to the attendant danger of fire or explosion. Another concern in the bonding of materials is material compatibility. Some materials, such as stainless steel, will not easily bond with aluminum alloys using the aforementioned welding processes.

One solution to the above-outlined problems is the friction weld procedure, which achieves a fusion bond. The friction welding fusion bonding process and its related processes rely on friction heat generation between surfaces to provide a material flux which may be forged to produce an integral bond between the surfaces. In the friction welding process, relative rotation between a pair of workpieces (i.e., the two pieces to be welded together, a rotatable workpiece and a stationary substrate workpiece) is caused while the workpieces are urged together.

After the friction welding process has started, on initial contact of the welding surfaces, there is a "burn-off" phase which removes foreign materials from contact area of both workpieces. The "burn-off" phase, is immediately followed, in an outward radial direction, by an "upset" phase where specific contact areas of both workpieces are turned to a plastic condition causing the establishment of a flux of hot metal due to the relative rotation and high axial pressure urging the two workpieces together, caused by resistive friction between the workpieces. After automatic or operator shutdown of the rotation of the rotatable workpiece, there is a "forging" phase where axial pressure is maintained between the workpieces until the plastisized material cools and the weld fuses during "fusion bonding" phase.

Typically, once sufficient heat is built up at the interface between the workpieces and both workpieces are plastisized at their respective contact areas, relative rotation is stopped and the workpieces are urged together under a forging force which may be the same as or greater than the original forging force.

The advantages of the friction welding process include, but are not limited to: (1) flux and shielding gas are not required; (2) in most cases, the weld strength is as strong as or stronger than the weaker of the two materials being joined; (3) surface cleanliness is not as significant, compared with other welding processes, since friction welding tends to disrupt and displace surface films; (4) there are narrow heat-affected zones; (5) the process is generally environmentally clean; (6) friction welding is suitable for welding most engineering materials and is well suited for joining many dissimilar metal combinations; (7) no filler material is needed; (8) operators are not required to have manual welding skills; (9) the process is easily automated for mass production; and (10) welds are made rapidly compared to other welding processes.

In conventional friction welding, the rotatable workpiece is attached to a motor driven unit and rotated at a predetermined speed, while the other stationary workpiece is maintained in a fixed, stationary orientation. When the appropriate rotational speed is reached, the two workpieces are brought together and an axial force is applied. Heat is generated as a result of the friction generated by the interface of the respective surfaces, which continues for a predetermined time or until a preset amount of upset takes place. Thereafter, the rotational driving force is discontinued and the rotation of the rotatable workpiece is stopped. The axial force between the two members is maintained or increased, however, for a predetermined period of time to finalize the weld. The rotatable workpiece can be cylindrical such as a stud or shaft, square, rectangular or other geometric configuration. The stationary workpiece can also be cylindrical such as a stud or shaft, square, rectangular or other geometric configuration.

The weld product resulting from a conventional friction weld process is characterized by a narrow heat affected zone and the presence of plastically deformed material around the weld which is identified as the fusion area. There are several disadvantages of the friction weld process that impede the achievement of maximum strength at the fusion area: (1) the residual plastically deformed material that is general built up at the base of the weld fusion area, during the upset phase, could cause interference with a mating part unless it is machined or ground off; (2) the plastically deformed material that is generally built up at the base of the weld fusion area, during the upset phase, heats up and cools down at different times and conditions than the center of the fusion area, causing inconsistent fusion zones throughout the rotatable workpiece and stationary substrate workpiece fusion weld area (3) the residual plastically deformed material that is generally built up at the base of the weld fusion area, during the upset phase, could impede the manner in which the material fused together bonds, thus leaving voids and other variations of inconsistent bonding throughout the fusion area and limiting the overall area and strength of the bond.

The friction welding fusion bond achieved, using special automatic techniques developed by the inventor of this invention, has proven the ability to provide for near elimination of build-up of the plastically deformed material which permits free threading of nuts on studs down to the substrate and clean bond areas where shafts are joined together. This may resolve some critical problems. However, the use of this new technique, which limits the build-up plastisized materials, does not eliminate all the concerns. For example, there are still some concerns for maximum achievable strength of the rotatable workpiece when joined to a substrate because: (1) the complete area of the rotatable workpiece is generally not fused, leaving outer perimeter voids, because of difference of temperature strata conditions on both heating and cooling down in both the rotatable workpiece and stationary substrate workpiece; (2) as with conventional friction welding described above, temperature strata conditions on both heating and cooling down will generally leave the outer peripheral edge weak if a bond to the substrate workpiece is achieved.

All friction welders have a means of holding the rotatable workpiece in a collett type device. Some colletts hold the workpiece by mechanically tightening and clamping against the workpiece, other colletts hold the workpiece by threads, still others have a slip-and lock arrangement, either direct mechanical linkage or by some sort of centrifugal clamping mechanism, which tightens up against the workpiece when rotation begins, and other colletts have various geometries to hold the rotatable workpiece during the friction welding process. This invention does not describe a new concept in a friction welding apparatus or a new concept in holding the friction welding rotatable fitting (bolt, stud, shaft, or etc.), but rather this invention deals with a concept that can be made an integral part or attachment to a rotatable friction welding fitting and, in some cases, the substrate, so as to increase strength and versatility of the rotatable workpiece and stationary substrate workpieces. It is pointed out that in some friction welding systems, both workpieces rotate and this invention may become part of both workpieces.

One solution to the above-outlined problems is the friction welding fusion enhancer apparatus, the subject of this invention. The friction welding fusion enhancer apparatus can be made an integral part or attachment to a rotatable friction welding fitting and, in some cases, applicable to the substrate workpiece, so as to increase strength and versatility of the rotatable workpiece and stationary substrate workpieces.

The advantages of the friction welding fusion enhancer apparatus include, but are not limited to: (1) maximum fusion bonding and weld strength can be achieved to and, in some cases, beyond the minor diameter of stud thread areas; (2) undesirable upset material in the form of plastic build-up outside of the fitting fusion area on a substrate can be virtually eliminated, depending on the desired strength of the end product; (3) nuts can be tightened down to the substrate because threads can remain usable once the friction welding fusion enhancer apparatus is removed; (4) rods, shafts or other components can be left in a clean condition, free of undesirable upset material in the form of residual plastisized material build-up present using normal friction welding techniques where maximum strength is achieved by bonding the complete area of the original fitting to the substrate; (5) removal of the friction welding fusion enhancer apparatus can be via threads or this apparatus, if made an integral part of the fitting, can be designed to break-away from the fitting after installation is completed, leaving a clean surface; (6) greater strength is achieved with the friction welding fusion enhancer apparatus.

Thus, while friction welding of one material has met with general acceptance in industry in the installation of fasteners and other components, there has been a need in the art for achieving predictable greater strengths for geometric configuration of specific size and material.

There has been an additional need in the art for friction welding of rods and other geometrical configurations, either to one another or to another substrate where the excessive plastic build-up of material is minimized after the weld is complete.

There has also been a need in the art for friction welding of threaded studs and other threaded components, where the excessive plastic build-up of material is minimized or nearly eliminated, after the weld is complete and nuts or other components can be placed directly against the substrate without the need to first remove unwanted excessive residual plastisized build-up of material normally found when the weld is completed.

There has been an additional need in the art for achieving greater strength in the weld area, eliminating excessive residual build-up of plastisized material without the need for additional machining or grinding and with an apparatus that is easy to install and remove.

SUMMARY OF THE INVENTION

The present invention solves significant problems in the art by providing a friction welding fusion enhancer apparatus and a method for its use. Generally described, the present invention provides for an apparatus that can be installed on an existing rotatable workpiece fitting or become an integral part of a friction welding rotatable workpiece, or in some cases, stationary substrate workpiece, to enhance both strength and versatility of the finished welded product. The friction welding fusion enhancer apparatus generally includes an extended temporary fusion area of similar or dissimilar area to the rotatable workpiece, that can be easily removed after the friction weld process has been completed.

In a preferred embodiment for achieving greater strengths and more even temperature distribution in the fusion area of both the rotatable workpiece and stationary substrate workpiece during the friction welding process, the friction welding fusion enhancer apparatus provides a means and method to achieve stronger bonding of both similar and dissimilar materials. Custom designed adapters that distribute greater temperature in desired fusion bonding area, so as to eliminate weak areas at the peripheral areas of the rotatable workpiece, are easily installed and later removed on the rotatable workpiece fitting, and in specific applications, on both the rotatable workpiece fitting and the stationary workpiece, such as when welding two rods together.

The apparatus includes one or more design type friction welding fusion enhancer apparatuses designed to fit a specific workpiece. The adapters can be threaded onto a stud or be slipped over a rod, stud, or other geometric configuration and held in place by a set screw or other holding means. The adapters will be custom shaped for a range of applications and friction welder apparatuses to achieve greater strength and versatility.

In another preferred embodiment of the invention for achieving greater strengths and more even temperature distribution in the fusion area of both the rotatable workpiece and stationary substrate workpiece during the friction welding process, the friction welding fusion enhancer apparatus provides a means and method to achieve stronger bonding of both similar and dissimilar materials.

Custom fittings where the friction welding fusion enhancer apparatus becomes an integral part of a rotatable workpiece are designed adapters that distribute greater temperature in the fusion bonding area, so as to eliminate weak areas at the peripheral areas of the rotatable workpiece and, in specific applications, on both the rotatable workpiece fitting and the stationary workpiece, such as when welding two rods together.

The apparatus includes a friction welding fusion enhancer apparatus designed as an integral part of a specific workpiece. The rotatable workpiece fittings or stationary workpiece fittings will be shaped for a range of applications and friction welder apparatuses to achieve greater strength and versatility. However, in this embodiment, the friction welding fusion enhancer apparatus will be designed to break-away after the fusion weld is completed to eliminate the excess material, thus offering a clean product, while enhancing the strength of the welded fitting, rod or other fastener. One or more design concepts could be effective.

DETAILED DESCRIPTION OF THE PREFERRED EMBODIMENTS

Figure 1:
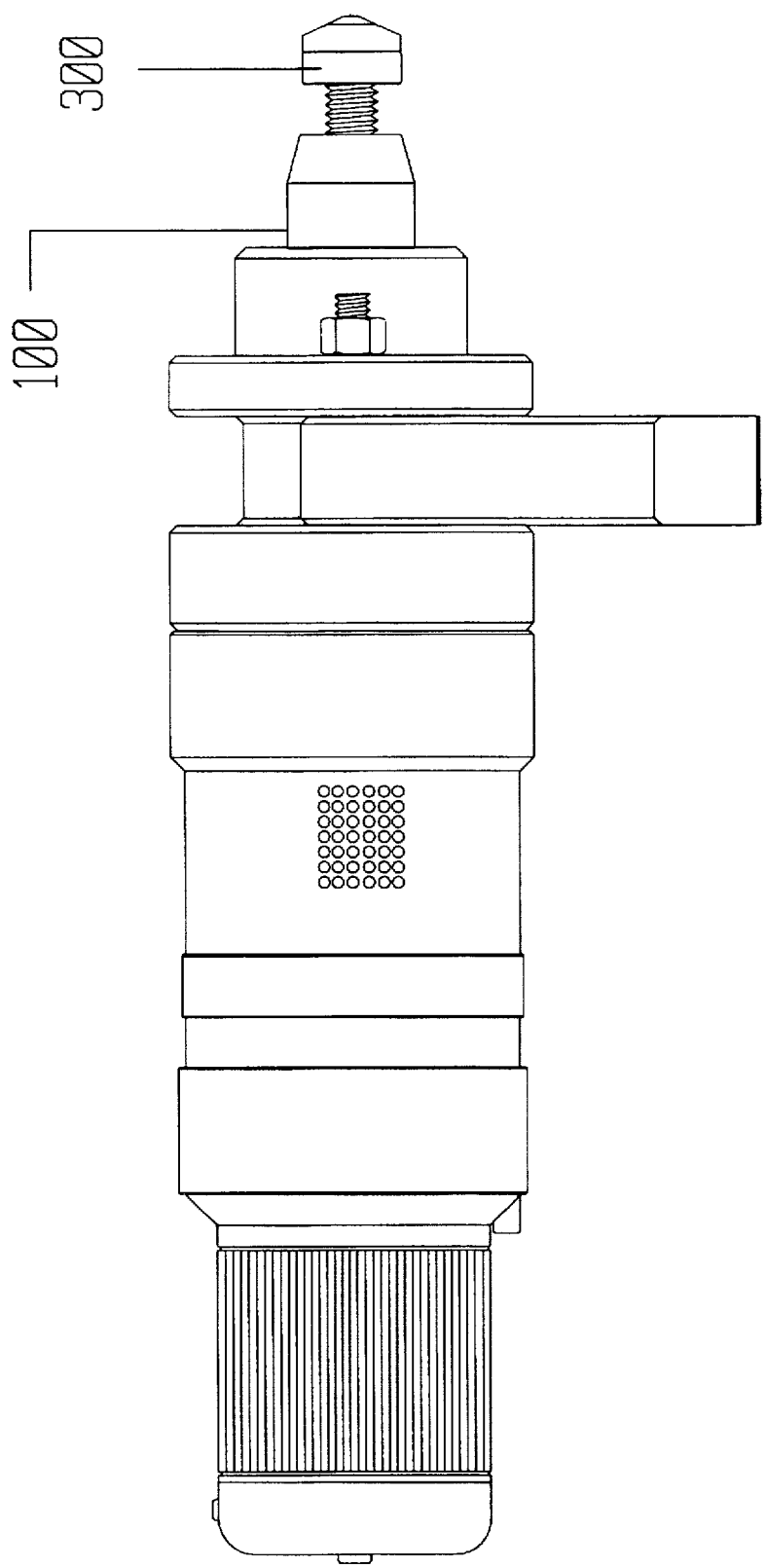
FIG. 1 is a side view of an exemplary fusion welder which may be used in conjunction with the apparatus of the invention.

Referring initially to FIGS. 1-9 of the drawings where several preferred embodiments of the friction welding fusion enhancer apparatus are shown where like numerals indicate like elements throughout the views. In any preferred embodiment, the friction welding fusion enhancer apparatus is generally held in place by a standard or custom designed friction welder apparatus workpiece fitting collett 100 (See FIG. 1)

Referring initially to FIGS. 2-5 of the drawings, where preferred embodiments of the friction welding fusion enhancer apparatus are shown where like numerals indicate like elements throughout the views, and the friction welding fusion enhancer apparatus is generally held in place by a standard or custom designed friction welder apparatus workpiece fitting collett 100. Also included is a friction welder rotatable workpiece, a non-integrated rotatable fitting 200, where a slip-on type a friction welding fusion enhancer apparatus 300 is installed on non-integrated rotatable fitting 200. Also included is a substrate workpiece 500 (included for reference—not shown), which could be stationary or rotatable. Friction welding fusion enhancer apparatus 300 can be fabricated as an adapter or be made an integral part of a friction welding fitting as will be described, respectively, in the two preferred embodiments below. Non-integrated rotatable fitting 200, friction welding fusion enhancer apparatus 300 and substrate workpiece 500 can be made from a number of materials, each similar to or dissimilar from the other depending on the application. Such materials include, but are not limited to stainless steel, carbon steel, aluminum alloys, brass, titanium, zirconium alloys and other alloys. These components are integrally coupled in a manner described below.

Referring to FIGS. 1-5, specific friction welder apparatus workpiece fitting colletts 100 could include colletts from any type friction welder, portable or stationary type, where such colletts could hold a non-integrated rotatable fitting 200 by mechanically tightening and clamping against the non-integrated rotatable fitting 200, or hold the non-integrated rotatable fitting 200 by threads, or hold the non-integrated rotatable fitting 200 by means of a slip-and lock arrangement, either direct mechanical linkage or by some sort of centrifugal type clamping mechanism, which tightens up against non-integrated rotatable fitting 200 when rotation begins. There are many other various geometries which are designed to hold the rotatable workpiece during the friction welding process. The collett is part of a friction welder apparatus (see FIG. 1) and is rotated or otherwise moved to create friction and, at the same time, the collett is urged toward the stationary workpiece to complete the friction welding process.

The non-integrated rotatable fitting 200, for a specific application, is designed to fit a specific collett and is inserted into the friction welder apparatus workpiece collett 100 in a secure fashion to permit friction welding of non-integrated rotatable fitting 200 to a substrate of similar or dissimilar materials.

Prior to the installation of non-integrated rotatable fitting 200 into friction welder apparatus workpiece fitting collett 100, a friction welding fusion enhancer apparatus 300 is secured in place in a manner shown in FIGS. 2-5, depending on whether or not the friction welding fusion enhancer apparatus 300 adapter is threaded or otherwise mechanically attached to the non-integrated rotatable fitting 200.

The non-integrated rotatable fitting 200 is generally round in geometry, but can be of other cross-sectional geometries such as square, rectangular, hex or other geometric configurations. Non-integrated rotatable fitting 200 consists of a non-integrated fitting shank 205 with threads if serving as a stud and rough or machined surface if serving as a shaft or other fastener.

Substrate workpiece 500 can be of various geometries such as flat, round, or other geometric configurations. Substrate workpiece 500 is generally stationary and clamped in place, but can be circular and moved in an axial direction in certain friction welding conditions and configurations.

Referring to FIGS. 2-5, non-integrated rotatable fitting 200 is depicted as a stud with a non-integrated fitting threads 201. A non-integrated fitting proximal end 202 is inserted into friction welder apparatus workpiece fitting collett 100. A non-integrated fitting distal end 203 is generally shaped with an angle to flat section to accommodate the friction welding process, but could be other type shaped geometry. Non-integrated fitting proximal end 202 will be designed to meet the geometric shape and locking requirements of a specific friction welder apparatus workpiece fitting collett 100.

Friction welding fusion enhancer apparatus 300 has a enhancer adapter internal threads 301 which permits threading friction welding fusion enhancer apparatus 300 onto threaded type non-integrated rotatable fitting 200 located where a enhancer adapter reaction surface 302 is located in line with a non-integrated fitting external peripheral edge 204 of non-integrated rotatable fitting 200 located at non-integrated fitting distal end 203, but may be formed to other geometric configurations that best serve the requirements of a specific friction welding application. Enhancer adapter reaction surface 302 is also designed to have minimum surface area contact with substrate workpiece 500 between the area of non-integrated fitting external peripheral edge 204 and a enhancer adapter external peripheral edge 304. At the completion of the friction welding process, enhancer adapter reaction surface 302 is rotated and urged against substrate workpiece 500 at the area adjacent to a enhancer adapter interface gap 303 to generate heat and plastisized material beyond non-integrated fitting external peripheral edge 204.

Figure 2:
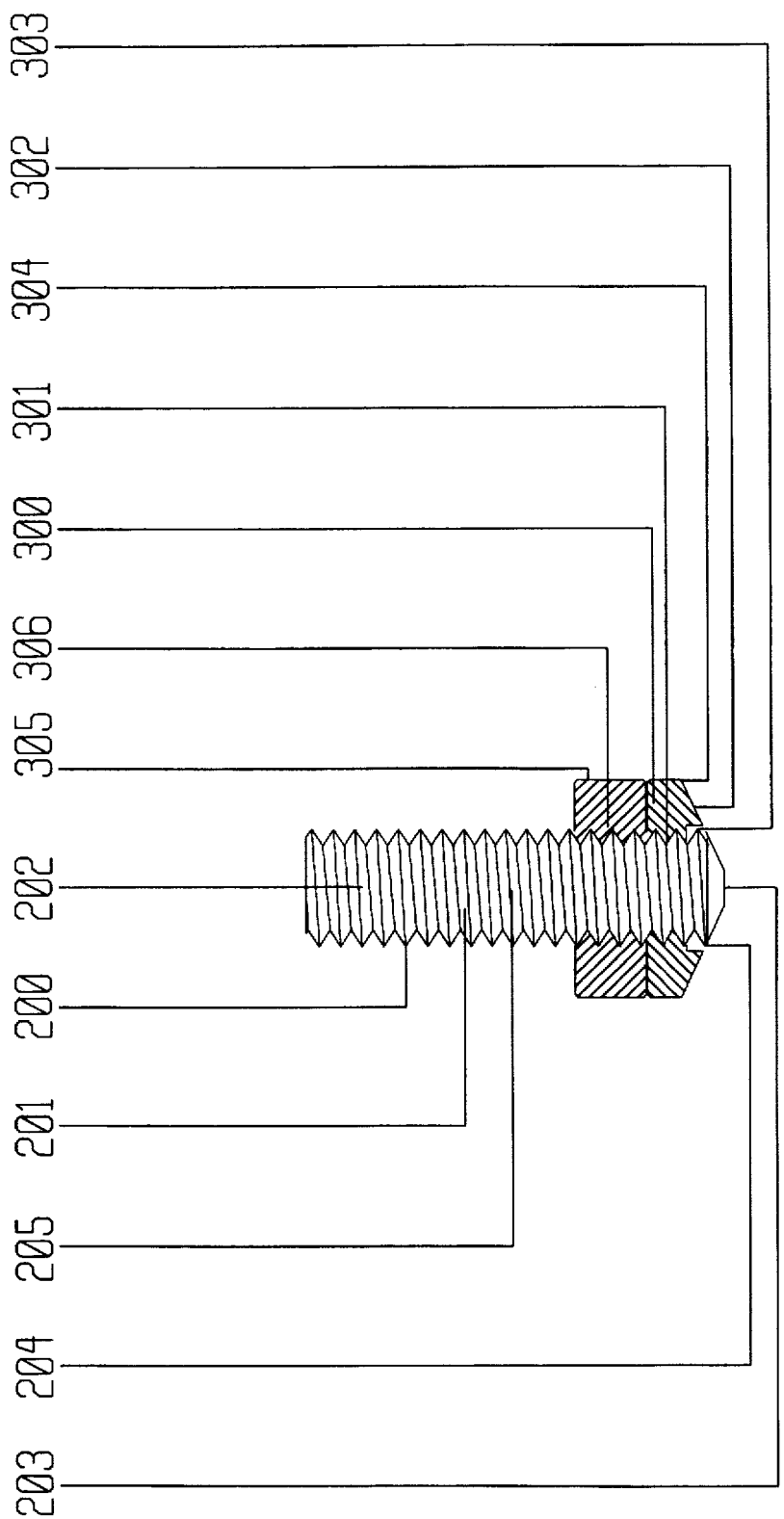
FIG. 2 is an overall cross-sectional side view of a preferred embodiment of the adapter type friction welding fusion enhancer apparatus showing the backup threaded nut of the present invention.
Figure 5:
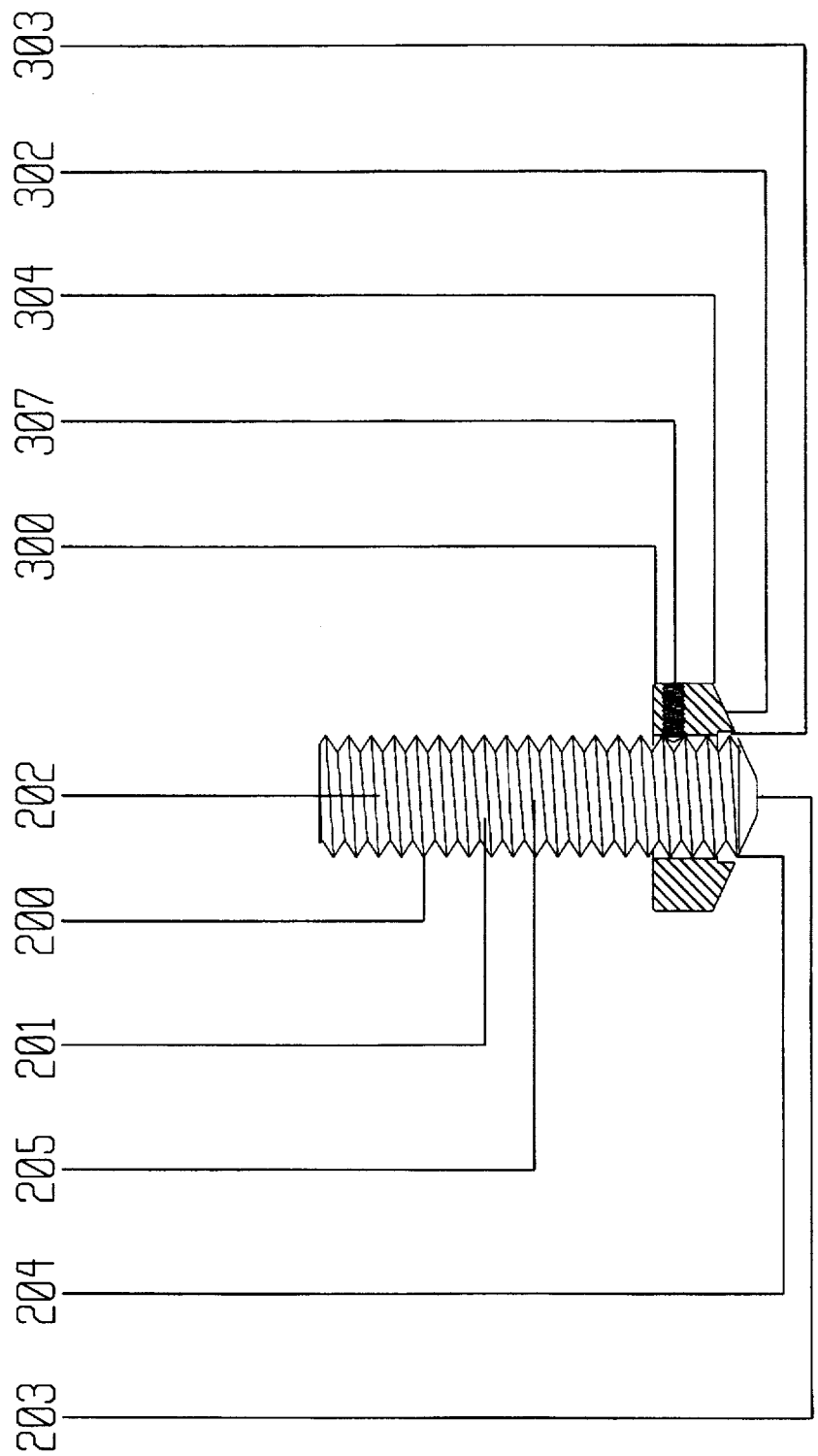
FIG. 5 is an overall cross-sectional side view of a preferred embodiment of the adapter type friction welding fusion enhancer apparatus showing the set screw fastening of the present invention.
Figure 6:
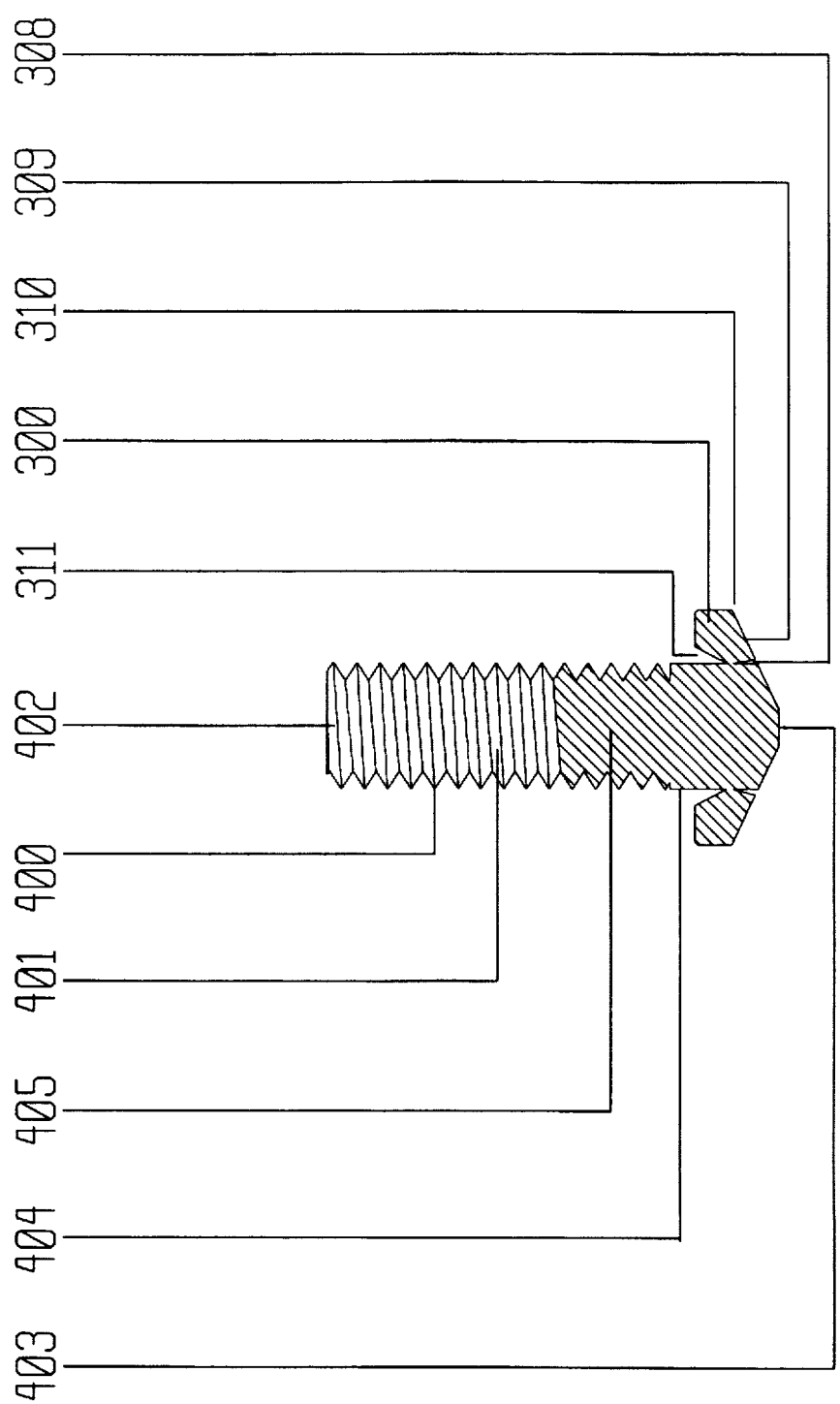
FIG. 6 is an overall cross-sectional side view of a preferred embodiment of the break-away slotted type integrated fitting type friction welding fusion enhancer apparatus of the present invention.
Figure 7:
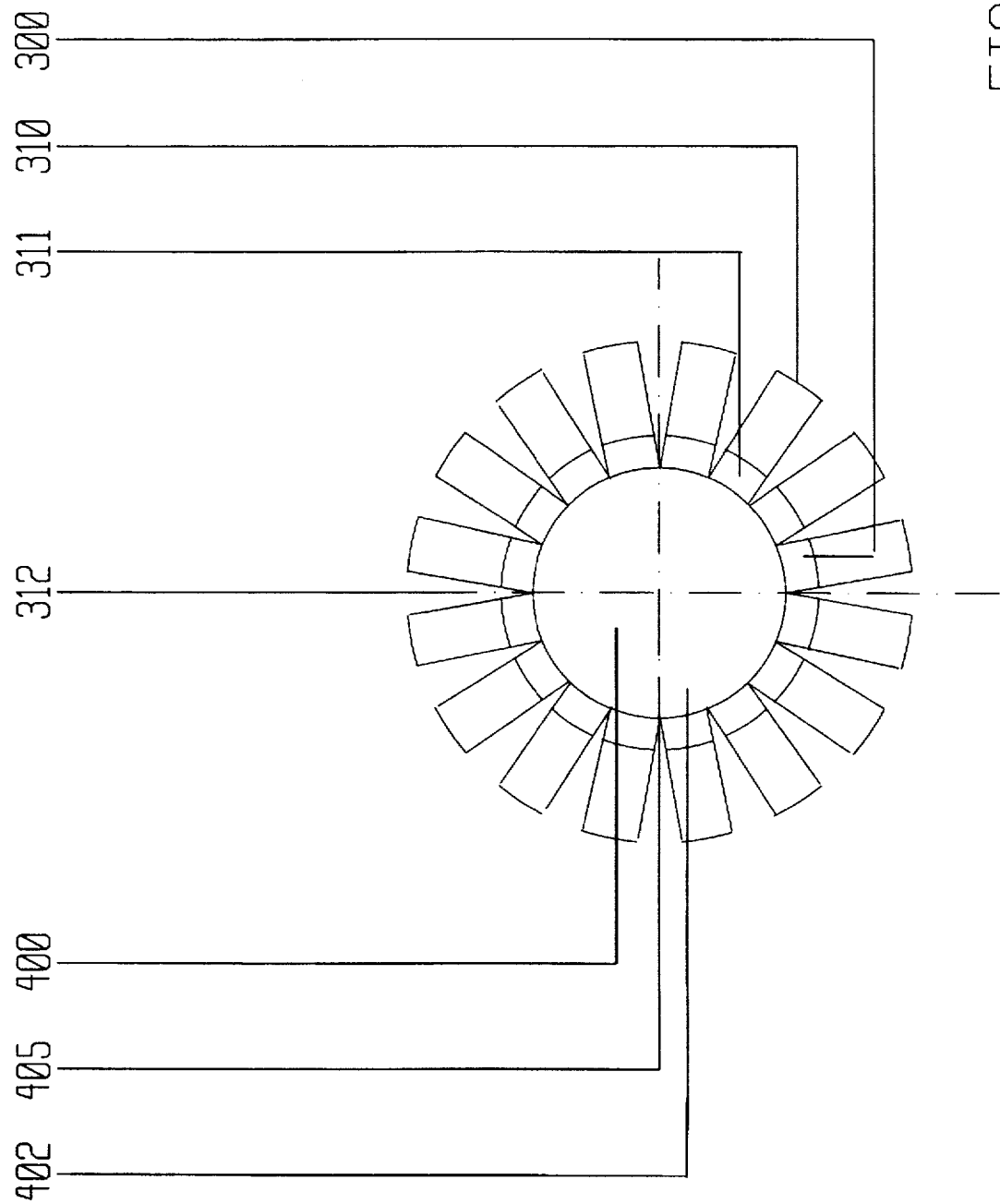
FIG. 7 is a proximal end view of a preferred embodiment of the break-away slotted type integrated fitting type friction welding fusion enhancer apparatus of the present invention.
Figure 8:
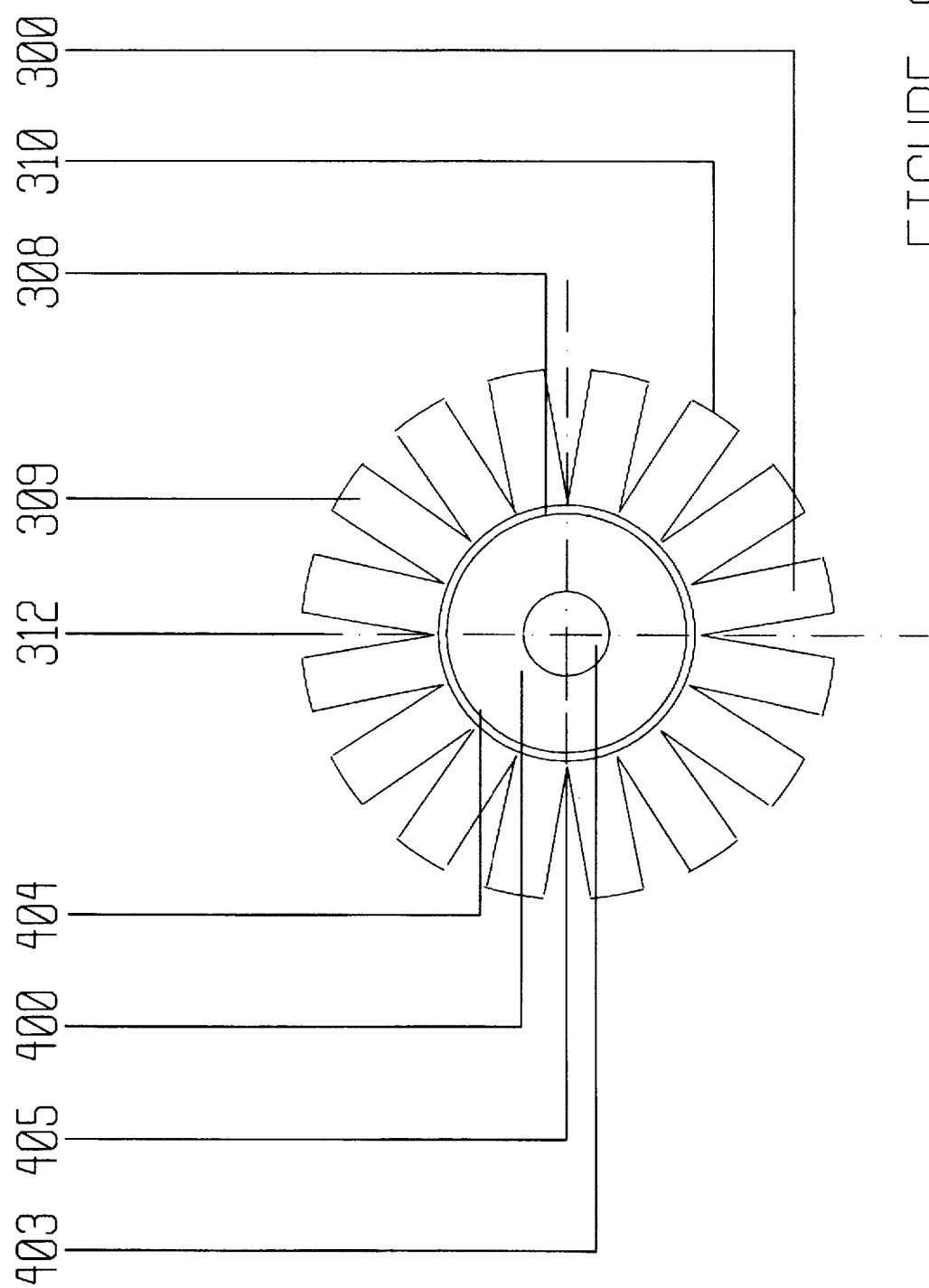
FIG. 8 is a distal end view of the embodiment of of the apparatus illustrated in FIG. 7.
Figure 9:
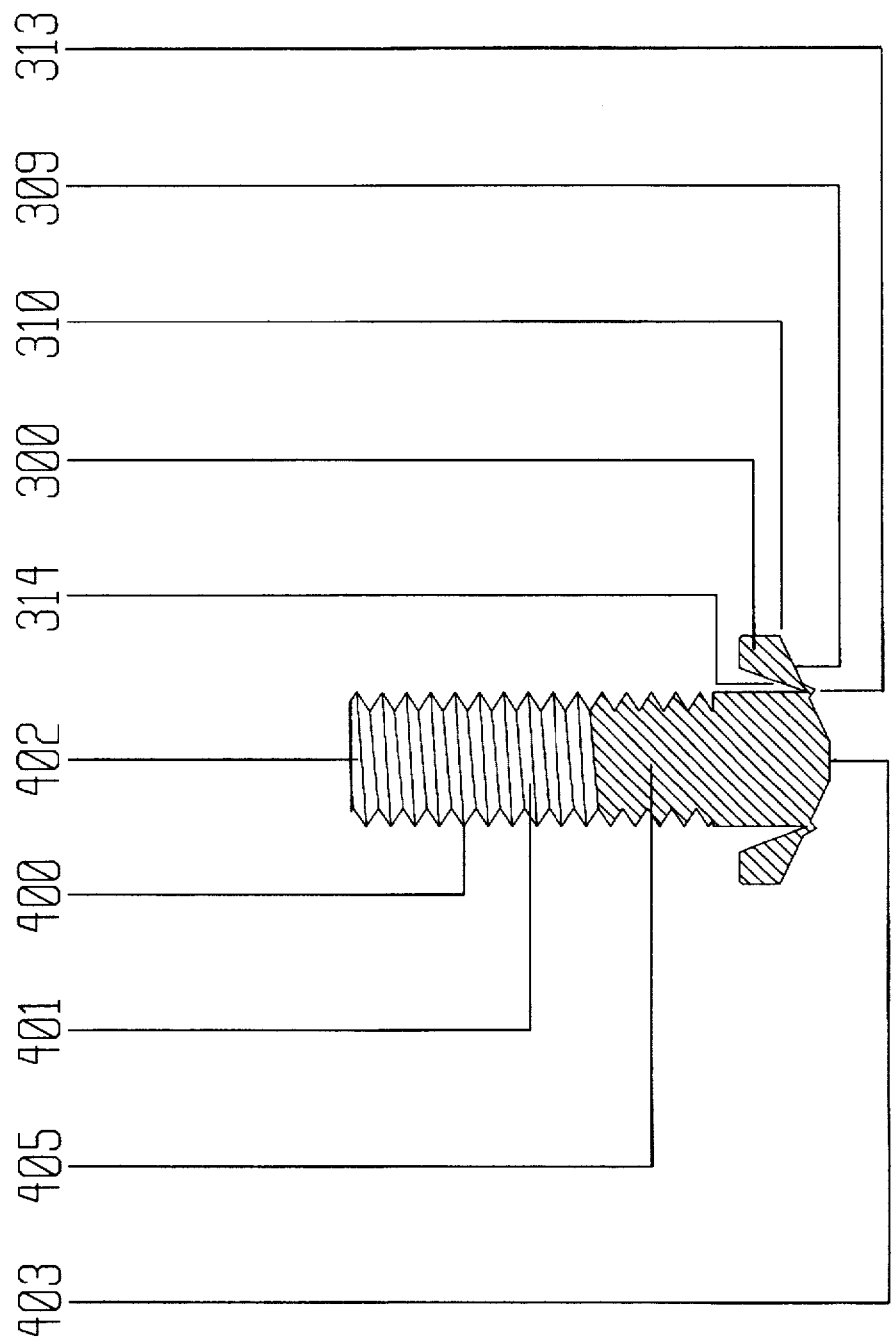
FIG. 9 is an overall cross-sectional side view of a preferred embodiment of the break-away reaction surface ridge type integrated fitting type friction welding fusion enhancer apparatus of the present invention.

Enhancer adapter reaction surface 302 may extends out past area of non-integrated fitting threads 201 major diameter, from non-integrated fitting external peripheral edge 204, at non-integrated fitting distal end 203, to enhancer adapter external peripheral edge 304 to a distance of approximately 50% of non-integrated fitting shank 205 diameter and is generally shaped at the same angle of non-integrated fitting distal end 203, but may be shaped differently. Enhancer adapter interface gap 303 is designed to provide isolation between friction welding fusion enhancer apparatus 300 and non-integrated rotatable fitting 200, specifically at the area of non-integrated fitting external peripheral edge 204. Enhancer adapter interface gap 303 is designed to a width and depth nominally 10 to 40% +/– of non-integrated fitting shank 205 diameter. A enhancer adapter backup nut 305 with a enhancer adapter backup nut threads 306, as shown in FIG. 2, may be used to tighten against and secure friction welding fusion enhancer apparatus 300 onto non-integrated rotatable fitting 200 depending on the application requirements. Friction welding fusion enhancer apparatus 300 may also be secured to non-integrated rotatable fitting 200 by one or more of a enhancer adapter set screw 307 as shown in FIG. 5. Other anchoring techniques could include lock type nuts, pins and other such devices (not shown) all of which secure friction welding fusion enhancer apparatus 300 onto non-integrated rotatable fitting 200.

In another preferred embodiment and referring initially to FIGS. 6–9, of the drawings, in which like numerals indicate like elements throughout the several views, the friction welding fusion enhancer apparatus 300 is set forth in FIGS. 6–9, and generally includes a standard or specific friction welder apparatus workpiece fitting collett 100 (included for reference—not shown), friction welding fusion enhancer apparatus 300, which is, in this embodiment, machined integral with the friction welding rotatable workpiece, a friction welder break-away rotatable fitting 400, which is, in itself, a rotatable workpiece with a friction welding fusion enhancer apparatus 300, made part thereof, but can be removed after the friction weld process has been completed. Friction welding fusion enhancer apparatus 300 can be fabricated as an adapter, as was previously described above, or be made an integral part of a friction welding fitting as will be described in the other preferred embodiments below. Also included is substrate workpiece 500 (included for reference—not shown), which could be stationary or rotatable. Friction welder break-away rotatable fitting 400, friction welding fusion enhancer apparatus 300 and substrate workpiece 500 can be made from a number of materials, each similar to or dissimilar from the other, depending on the application. Such materials include, but are not limited to stainless steel, carbon steel, aluminum alloys, brass, titanium, zirconium alloys and other alloys. These components are integrally coupled in a manner described below.

Referring to FIGS. 6–9, friction welder apparatus workpiece fitting collett 100 (see FIG. 1) could include colletts from any type friction welder, portable or stationary type, where such colletts could hold friction welder break-away rotatable fitting 400 by mechanically tightening and clamping against the friction welder break-away rotatable fitting 400, or hold the friction welder break-away rotatable fitting 400 by threads, or hold the friction welder break-away rotatable fitting 400 by means of a slip-and lock arrangement, either direct mechanical linkage or by some sort of centrifugal type clamping mechanism, which tightens up against friction welder break-away rotatable fitting 400 when rotation begins. There are many other various geometries which are designed to hold the rotatable workpiece during the friction welding process. The collett is part of a friction welder apparatus and is rotated or otherwise moved to create friction and, at the same time, the collett is urged toward the stationary workpiece to complete the friction welding process.

The friction welder break-away rotatable fitting 400, for a specific application, is designed to fit a specific collett and is inserted into the friction welder apparatus workpiece fitting collett 100 in a secure fashion to permit friction welding of friction welder break-away rotatable fitting 400 to a substrate workpiece 500, which can be made of similar or dissimilar materials.

The friction welder break-away rotatable fitting 400 is a friction weld fitting made integral with a similar type of friction welding fusion enhancer apparatus 300 generally described in the first preferred embodiment herein, but with changes required for an integral structure that can be removed after the friction welding fusion bond has been completed. Friction welder break-away rotatable fitting 400 and friction welding fusion enhancer apparatus 300 integral component are generally round in geometry, but can be of other cross-sectional geometries such as square, rectangular, hex or other geometric configurations. Friction welder break-away rotatable fitting 400 consists of a shank with threads if serving as a stud and rough or machined surface if serving as a shaft or other fastener, or of another configuration. Substrate workpiece 500 can be of various geometries such as flat, round, or other geometric configurations. Substrate workpiece 500 is generally stationary and clamped in place, but can be circular and moved in an axial direction in certain friction welding conditions and configurations.

Figure 3:
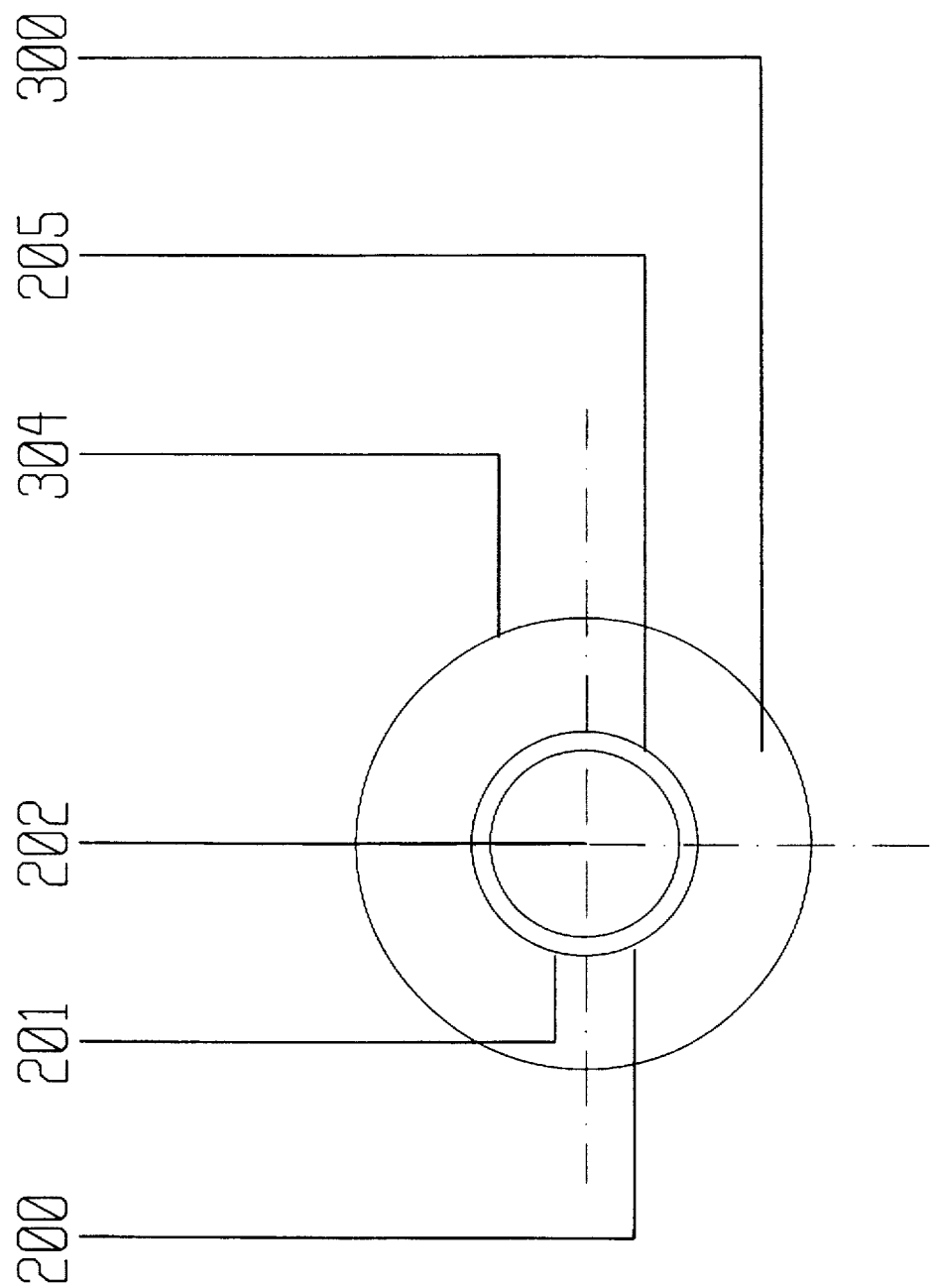
FIG. 3 is a proximal end view of the embodiment illustrated in FIG. 2.
Figure 4:
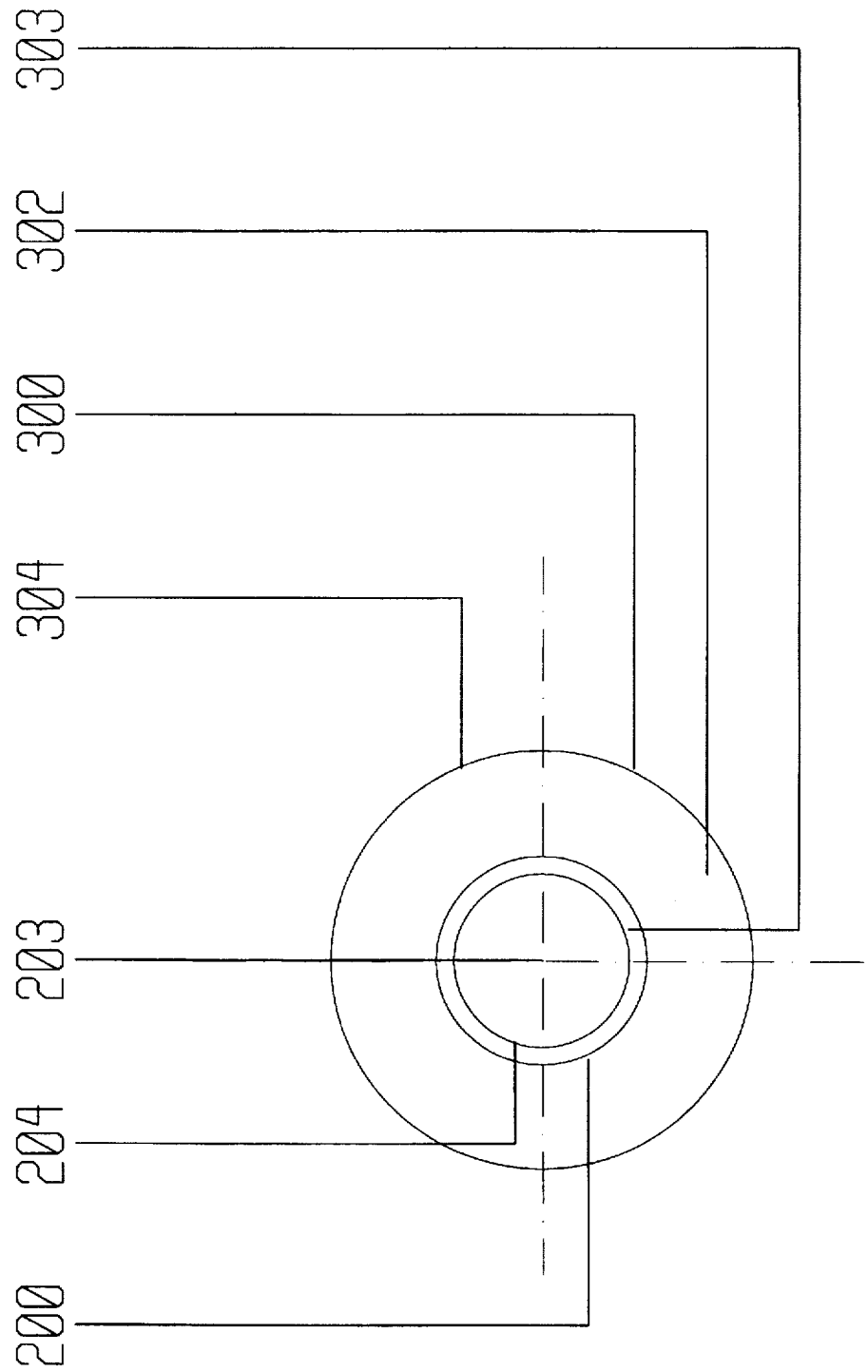
FIG. 4 is a distil end view of the embodiment illustrated in FIG. 2.

Referring to FIGS. 3–4, friction welder break-away rotatable fitting 400 is depicted as a stud with a break-away fitting threads 401. A break-away fitting proximal end 402 is inserted into friction welder apparatus workpiece fitting collett 100. A break-away fitting distal end 403 is generally shaped with an angle to flat section to accommodate the friction welding process, but could be of other type shaped geometry. Break-away fitting proximal end 402 will be designed to meet the geometric shape and locking requirements of a specific friction welder apparatus workpiece fitting collett 100.

Friction welder break-away rotatable fitting 400, and integral friction welding fusion enhancer apparatus 300, has at its break-away fitting distal end 403, a integrated enhancer reaction surface 309 which extends out radially, past break-away fitting distal end 403, from a integrated enhancer interface gap 308 out to a integrated enhancer external peripheral edge 310. Integrated enhancer interface gap 308, whose width and depth is nominally 10 to 40% +/- of a break-away fitting shank 405 diameter. Integrated enhancer reaction surface 309 may extend out past area of break-away fitting threads 401 major diameter to integrated enhancer external peripheral edge 310 from a break-away fitting external peripheral edge 404, to a distance of approximately 50% of break-away fitting shank 405 diameter. The actual dimensions of integrated enhancer interface gap 308, integrated enhancer reaction surface 309 and integrated enhancer external peripheral edge 310 will vary depending on the application and materials used.

At the top of friction welding fusion enhancer apparatus 300 configuration opposite break-away fitting distal end 403, there is a integrated enhancer break-away groove 311 which allows for removal of friction welding fusion enhancer apparatus 300 configuration from friction welder break-away rotatable fitting 400. The removal point of friction welding fusion enhancer apparatus 300 configuration that was originally made part of friction welder break-away rotatable fitting 400 is further facilitated by a integrated enhancer break-away slots 312, machined outward toward integrated enhancer external peripheral edge 310, starting from the major diameter of break-away fitting threads 401 or break-away fitting shank 405 diameter at a point identified as break-away fitting external peripheral edge 404 or other geometric configuration at the same general location, if not threaded. Number, shape and size of integrated enhancer break-away slots 312 may vary from application to application.

Integrated enhancer reaction surface 309 provides additional contact surface to generate greater surface area heat with substrate workpiece 500. During the fusion process, friction welder break-away rotatable fitting 400 is rotated and urged toward substrate workpiece 500 to create friction and complete the friction welding process. The contact of integrated enhancer reaction surface 309 to stationary substrate workpiece 500 is essential for achieving greater strengths and more even temperature strata during the friction welding process, so as to distribute greater temperature in desired fusion bonding area, so as to eliminate weak areas at the peripheral areas of the rotatable workpiece.

Integrated enhancer break-away groove 311 is machined to provide a thin section between its bottom and integrated enhancer interface gap 308, so when combined with integrated enhancer break-away slots 312, friction welding fusion enhancer apparatus 300 can be easily removed once the friction welding of friction welder break-away rotatable fitting 400 to substrate workpiece 500 has been completed and removed from friction welder break-away rotatable fitting 400 shank at a point where integrated enhancer interface gap 308 meets break-away fitting distal end 403. The removal of expended friction welding fusion enhancer apparatus 300 will, with proper techniques, permit a clean shank with no permanent build-up of the residual plastisized material which would normally be present in increasing the fusion area to the full cross-section Referring to FIG. 9, another alternate design concept of the friction welding fusion enhancer apparatus 300 made integral with friction welder break-away rotatable fitting 400 is inserted into friction welder apparatus workpiece fitting collett 100 in the same manner as described above for a specific application. Break-away fitting threads 401, break-away proximal end 402, break-away fitting distal end 403 and break-away fitting shank 405 diameter are similar in design and applications as described above for friction welder break-away rotatable fitting 400. The interface at break-away fitting distal end 403 has been changed to include a integrated enhancer interface reaction ridge 313 at the location where break-away fitting external peripheral edge 404 previously existed. Additionally, integrated enhancer break-away groove 311 has been replaced with a integrated enhancer break-away deep groove 314 which provides for a thin cross section between its bottom and integrated enhancer interface reaction ridge 313 at the break-away fitting distal end 403 interface with friction welding fusion enhancer apparatus 300. Integrated enhancer reaction surface 309 continues out to integrated enhancer external peripheral edge 310 as described above. Integrated enhancer break-away slots 312, of the type illustrated in FIGS. 7–8, may or may not be included in this alternate concept. The shape, size, and arrangement of integrated enhancer break-away slots 312, integrated enhancer interface reaction ride, and integrated enhancer break-away deep groove 314 may vary from application to application.

Integrated enhancer interface reaction ridge 313 and integrated enhancer reaction surface 309 provide additional contact surface to generate greater surface area heat with substrate workpiece 500. During the fusion process, friction welder break-away rotatable fitting 400 is rotated and urged toward substrate workpiece 500 to create friction and complete the friction welding process. The contact of integrated enhancer interface reaction ridge 313 and integrated enhancer reaction surface 309 to stationary substrate workpiece 500 is essential for achieving greater strengths and more even temperature strata during the friction welding process, so as to distribute greater temperature in desired fusion bonding area, so as to eliminate weak areas at the peripheral areas of the rotatable workpiece. The integrated enhancer interface reaction ridge 313 and integrated enhancer break-away deep groove 314 should be designed so that the material cross-section area between these two elements is such that the material is expended during the friction welding fusion bonding process to the extent that friction welding fusion enhancer apparatus 300 can easily be removed, with proper techniques, so as to permit a clean shank with no permanent build-up of the residual plastisized material which would normally be present in increasing the fusion area to the full cross-section

OPERATION

Operation of friction welding fusion enhancer apparatus 300 is governed by the particular friction welder apparatus and, specifically, the control of speed and axial force provided at the point where the rotatable friction welding fitting is installed in a friction welder apparatus workpiece fitting collett 100. Prior to commencing the use of the friction welding fusion enhancer apparatus 300, the operator must determine if it is more desirable to utilize a non-integrated rotatable fitting 200 or custom designed friction welder break-away rotatable fitting 400. The operator's choice will depend on the particular application.

Considering using the first preferred embodiment, the operator made the decision to install non-integrated rotatable fitting 200 and install a threaded non-integrated fitting shank 205 or slip on friction welding fusion enhancer apparatus 300 of either the threaded type with enhancer adapter internal threads 301, backed up with enhancer adapter back-up nut 305 with enhancer adapter backup nut threads 306 or mechanically secured type such as secured by enhancer adapter set screw 307 on non-integrated fitting shank 205. The operator, in the case of a threaded device, will thread friction welding fusion enhancer apparatus 300 via enhancer adapter internal threads 301 on to non-integrated rotatable fitting 200 until enhancer adapter reaction surface 302 is located in line with non-integrated fitting external peripheral edge 204 of non-integrated rotatable fitting 200 located at non-integrated fitting distal end 203.

In considering the installation of a slip-on friction welding fusion enhancer apparatus 300, the operator will slide friction welding fusion enhancer apparatus 300 over non-integrated fitting threads 201 or non-integrated fitting shank 205, if not threaded and onto non-integrated rotatable fitting 200, until enhancer adapter reaction surface 302 is located in line with non-integrated fitting external peripheral edge 204 of non-integrated rotatable fitting 200 non-integrated fitting distal end 203. The operator will then secure friction welding fusion enhancer apparatus 300 to non-integrated rotatable fitting 200 with enhancer adapter set screw 307 or other type of mechanical fastener.

The operator then installs non-integrated rotatable fitting 200 non-integrated fitting proximal end 202 into friction welder apparatus workpiece fitting collett 100. The design of friction welder apparatus workpiece fitting collett 100 could include colletts of various designs from any type friction welder, portable or stationary type, where such colletts could hold a non-integrated rotatable fitting 200 by mechanically tightening and clamping against the non-integrated rotatable fitting 200, or hold the non-integrated rotatable fitting 200 by threads, or hold the non-integrated rotatable fitting 200 by means of a slip-and lock arrangement, either direct mechanical linkage or by some sort of centrifugal type clamping mechanism which tightens up against non-integrated rotatable fitting 200 when rotation begins. There are many other various geometries which are designed to hold the rotatable workpiece during the friction welding process. The collett is part of a friction welder apparatus and is rotated or otherwise moved to create friction, and at the same time, the collett is urged toward the stationary workpiece to complete the friction welding process.

In operation, non-integrated rotatable fitting 200, installed in friction welder apparatus workpiece fitting collett 100, and friction welding fusion enhancer apparatus 300, securely attached to non-integrated rotatable fitting 200 in either a threaded manner with non-integrated fitting threads 201, or slip on manner described above, will be rotated and urged toward substrate workpiece 500 to complete the friction welding process.

After the friction welding process has started, on initial contact of the welding surfaces, there is a "burn-off" phase which removes foreign materials from contact area both workpieces, (where the workpiece contact areas are defined as non-integrated rotatable fitting 200 non-integrated fitting distal end 203, contact area of friction welding fusion enhancer apparatus 300 enhancer adapter reaction surface 302 and contact area of substrate workpiece 500). The "burn-off" phase, is immediately followed, in an outward radial direction, by an "upset" phase where specific defined contact areas of both workpieces are turned to a plastic condition causing the establishment of a flux of hot metal due to the relative rotation and high axial pressure urging the two workpieces together, caused by resistive friction between the workpieces. After automatic or operator shut-down of the rotation of the rotatable workpiece, there is a "forging" phase where axial pressure is maintained between the workpieces until the plastisized material cools and the weld fuses during "fusion bonding" phase.

The friction welder will be programmed to stop so that fusion extends out to non-integrated fitting external peripheral edge 204, thereby achieving greater strengths and more even temperature strata during the friction welding process, so as to distribute greater temperature in desired fusion bonding area, so as to eliminate weak areas at the peripheral areas of the rotatable workpiece. It is believed that the more even and extended fusion area is achieved because enhancer adapter reaction surface 302, out to enhancer adapter external peripheral edge 304, becomes extremely hot and causes the substrate workpiece 500 fusion area to become plastisized over a greater area and out to enhancer adapter interface gap 303, thus permitting non-integrated rotatable fitting 200 to fuse to substrate workpiece 500 out to its non-integrated fitting external peripheral edge 204, rather than a smaller fusion area as would be achieved without the use of friction welding fusion enhancer apparatus 300. Considering using the second preferred embodiment, the operator made the decision to install friction welder break-away rotatable fitting 400 with its integrated friction welding fusion enhancer apparatus 300. There are no adjustments to be made by the operator prior to installing friction welder break-away rotatable fitting 400.

In considering the installation of an integrated friction welding fusion enhancer apparatus 300, the operator will install friction welder break-away rotatable fitting 400 into friction welder apparatus workpiece fitting collett 100. The design of friction welder apparatus workpiece fitting collett 100 could include colletts of various designs from any type friction welder, portable or non-movable stationary type, where such colletts could hold a friction welder break-away rotatable fitting 400 by mechanically tightening and clamping against the friction welder break-away rotatable fitting 400, or hold the friction welder break-away rotatable fitting 400 by break-away fitting threads 401 located at break-away fitting proximal end 402, or hold the friction welder break-away rotatable fitting 400 by means of a slip-and lock arrangement, either direct mechanical linkage or by some sort of centrifugal type clamping mechanism which tightens up against friction welder break-away rotatable fitting 400 when rotation begins. There are many other various geometries which are designed to hold the rotatable workpiece during the friction welding process. The collett is part of a friction welder apparatus and is rotated or otherwise moved to create friction, and at the same time, the collett is urged toward the stationary workpiece to complete the friction welding process.

In operation, friction welder break-away rotatable fitting 400 break-away fitting shank 405 is installed in friction welder apparatus workpiece fitting collett 100 with friction welding fusion enhancer apparatus 300, securely and integrally attached to friction welder break-away rotatable fitting 400. Friction welder break-away rotatable fitting 400, securely installed in either a threaded or slip on manner described above, will be rotated and urged toward substrate workpiece 500 to create friction and complete the friction welding process.

After the friction welding process has started, on initial contact of the welding surfaces, there is a "burn-off" phase which removes foreign materials from contact area on both workpieces, (where the workpiece contact areas are defined as friction welder break-away rotatable fitting 400 break-away fitting distal end 403, contact area of friction welding fusion enhancer apparatus 300 integrated enhancer reaction surface 309 and contact area of substrate workpiece 500).

The "burn-off" phase, is immediately followed, in an outward radial direction, by an "upset" phase where specific defined contact areas of both workpieces are turned to a plastic condition, causing the establishment of a flux of hot metal due to the relative rotation and high axial pressure urging the two workpieces together, caused by resistive friction between the workpieces. After automatic or operator shutdown of the rotation of the rotatable workpiece, there is a "forging" phase where axial pressure is maintained between the workpieces until the plastisized material cools and the weld fuses during "fusion bonding" phase.

The friction welder will be programmed to stop, so that fusion extends out to break-away fitting external peripheral edge 404, thereby achieving greater strengths and more even temperature strata during the friction welding process, so as to distribute greater temperature in desired fusion bonding area at the break-away fitting distal end 403 area and out to and including break-away fitting external peripheral edge 404, so as to eliminate weak areas at the peripheral areas of the rotatable workpiece.

The more even and extended fusion area is achieved because integrated enhancer reaction surface 309 become extremely hot and causes the substrate workpiece 500 fusion area to become plastisized over a greater area and out to integrated enhancer interface gap 308, thus permitting friction welder break-away rotatable fitting 400 to fuse to substrate workpiece 500 out to break-away fitting external peripheral edge 404, rather than a smaller fusion area as would be achieved without the use of friction welding fusion enhancer apparatus 300.

Once the friction welding of friction welder break-away rotatable fitting 400 is completed and the friction welder operation has ceased, the integral friction welding fusion enhancer apparatus 300 will then be broken away and removed from friction welder break-away rotatable fitting 400 by severing friction welding fusion enhancer apparatus 300 from the integral structure at integrated enhancer interface gap 308, integrated enhancer break-away groove 311 and integrated enhancer break-away slots 312 out to integrated enhancer external peripheral edge 310, all located outside of break-away fitting distal end 403 and break-away fitting shank 405.

Now in considering using the alternate design of the second preferred embodiment, the operator made the decision to install friction welder break-away rotatable fitting 400 with its integrated friction welding fusion enhancer apparatus 300. Again, there are no adjustments to be made by the operator prior to installing friction welder break-away rotatable fitting 400. The operator will install friction welder break-away rotatable fitting 400 into friction welder apparatus workpiece fitting collett 100. As aforementioned, the design of friction welder apparatus workpiece fitting collett 100 could include colletts of various designs from any type friction welder, portable or non-movable stationary type, where such colletts could hold a friction welder break-away rotatable fitting 400 by mechanically tightening, clamping or threading, or hold the friction welder break-away rotatable fitting 400 by means of a slip-and lock arrangement, either direct mechanical linkage or by some sort of centrifugal type clamping mechanism which tightens up against friction welder break-away rotatable fitting 400 when rotation begins. There are many other various geometries which are designed to hold the rotatable workpiece during the friction welding process. The collett is part of a friction welder apparatus and is rotated or otherwise moved to create friction, and at the same time, the collett is urged toward the stationary workpiece to complete the friction welding process.

In operation, friction welder break-away rotatable fitting 400 break-away fitting shank 405 is installed in friction welder apparatus workpiece fitting collett 100 with friction welding fusion enhancer apparatus 300, securely attached to friction welder break-away rotatable fitting 400. Friction welder break-away rotatable fitting 400 is securely installed in either a threaded or slip on manner described above, and will be rotated and urged toward substrate workpiece 500 to create friction and complete the friction welding process.

After the friction welding process has started on initial contact of the welding surfaces, there is a "burn-off" phase which removes foreign materials from contact area on both workpieces, (where the workpiece contact areas are defined as friction welder break-away rotatable fitting 400 break-away fitting distal end 403, contact area of friction welding fusion enhancer apparatus 300, integrated enhancer interface reaction ridge 313 and integrated enhancer reaction surface 309 and contact area of substrate workpiece 500). The "burn-off" phase, is immediately followed, in an outward radial direction, by an "upset" phase where specific defined contact areas of both workpieces are turned to a plastic condition causing the establishment of a flux of hot metal due to the relative rotation and high axial pressure urging the two workpieces together caused by resistive friction between the workpieces. After automatic or operator shutdown of the rotation of the rotatable workpiece, there is a "forging" phase where axial pressure is maintained between the workpieces until the plastisized material cools and the weld fuses during "fusion bonding" phase.

The friction welder will be programmed to stop, so that fusion extends past integrated enhancer interface reaction ridge 313, thereby achieving greater strengths and more even temperature strata during the friction welding process, so as to distribute greater temperature in desired fusion bonding area at the break-away fitting distal end 403 area and out to and including integrated enhancer interface reaction ridge 313 which is located near break-away fitting shank 405 break-away fitting external peripheral edge 404, so as to eliminate weak areas at the peripheral areas of the rotatable workpiece.

The more even and extended fusion area is achieved because integrated enhancer interface reaction ridge 313 and integrated enhancer reaction surface 309, out to integrated enhancer external peripheral edge 310, becomes extremely hot and causes the substrate workpiece 500 fusion area to become plastisized over a greater area and out to, or beyond, integrated enhancer interface reaction ridge 313, thus permitting friction welder break-away rotatable fitting 400 to fuse to substrate workpiece 500 out to a distance equal break-away fitting shank 405 break-away fitting external peripheral edge 404, at the break-away fitting distal end 403, rather than a smaller fusion area as would be achieved without the use of friction welding fusion enhancer apparatus 300.

In this alternate operation, the integrated enhancer interface reaction ridge 313 and integrated enhancer reaction surface 309 provides additional contact surface to generate greater surface area heat with substrate workpiece 500. During the fusion process, friction welder break-away rotatable fitting 400 is rotated and urged toward substrate workpiece 500 to create friction and complete the friction welding process. The contact of integrated enhancer interface reaction ridge 313 and integrated enhancer reaction surface 309 to stationary substrate workpiece 500 generates greater temperature over an extended fusion area and assures a more even temperature strata during the friction welding process, so as to eliminate weak areas at the peripheral areas of the rotatable workpiece. The integrated enhancer interface reaction ridge 313 and integrated enhancer break-away deep groove 314, designed with a limited material cross-section area between these two elements, permits material to be expended during the friction welding fusion bonding process to the extent that friction welding fusion enhancer apparatus 300 can easily be removed, with proper techniques, so as to permit a clean shank with no permanent build-up of the residual plastisized material which would normally be present in increasing the fusion area to the full cross-section.

From the foregoing description, those skilled in the art will appreciate that all of the objectives of the present invention are realized. The friction welding fusion enhancer apparatus 300 could be made an integral part of or adapted to the substrate workpiece 500, whether substrate workpiece be stationary or rotatable. The friction welding fusion enhancer apparatus 300 can also be made from different materials than the rotatable fitting workpiece, whether or not friction welding fusion enhancer apparatus 300 is an adapter as described in the preferred embodiment shown with non-integrated rotatable fitting 200 or an integral part with a rotatable friction welder break-away rotatable fitting 400. Prototype test results, completed by the inventor, have shown the present invention effective in enhancing friction weld fusion bonding strength, while permitting significant reduction of plastisized material build-up.

Having described the invention in detail, those skilled in the art will appreciate that modifications may be made to the invention without departing from its spirit. Therefore, it is not intended that the scope of the invention be limited to the specific embodiments, illustrated and described. Rather, it is intended that the scope of the invention be determined by the appended claims and their equivalents.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. A friction welding fusion enhancer apparatus which can be utilized with a wide range of friction welder machines for increasing the fusion area of a rotatable workpiece to be friction welded to a substrate workpiece, of either similar or dissimilar materials, for the purpose of achieving greater strength than achieved with conventional methods, while limiting the build-up of plastisized matter around the peripheral edge of the rotatable workpiece in an operation comprising a burn off, upset, forging, fusing and apparatus removal phases, said apparatus comprising:

a reaction surface area greater than said rotatable workpiece is made part of said friction welding fusion enhancer apparatus and further said reaction surface area is located opposite said rotatable workpiece engagement end where further said reaction surface area is removable;

an engagement means for engagement with a chuck of said friction welding machines to permit holding of said friction welding fusion enhancer apparatus during said burnoff, upset, forging, and fusing phases; and a reaction surface area that can be removable from the stud, shaft or other weldable devices after the stud is friction welded to the substrate.

2. The apparatus of claim 1, wherein said friction welding fusion enhancer apparatus can be made of similar or dissimilar materials as compared to said rotatable workpiece.

3. The apparatus of claim 1, wherein said friction welding fusion enhancer apparatus can be of various geometric configurations.

4. The apparatus of claim 1, wherein said friction welding fusion enhancer apparatus can be comprised of one or more components.

5. The apparatus of claim 1, wherein said friction welding fusion enhancer apparatus reaction surface area can be of various geometric configurations and further said reaction surface area can be smooth, rough or made of dissimilar materials.

6. The apparatus of claim 5, wherein said friction welding fusion enhancer apparatus reaction surface area extends past the outer diameter of said rotatable workpiece.

7. The apparatus of claim 6, wherein said friction welding fusion enhancer apparatus reaction surface area is removable after completion of said burnoff, upset, forging, and fusing phases.

8. A method of increasing the fusion area of said rotatable workpiece to be friction welded to a substrate for achieving greater strength, than with conventional methods, while limiting the build-up of plastisized matter around the peripheral of the said rotatable workpiece and said friction welding fusion enhancer apparatus utilizing the apparatus of claim 1.

9. A friction welding fusion enhancer apparatus which can be utilized with a wide range of friction welder machines for increasing the fusion area of a rotatable workpiece to be friction welded to a substrate workpiece, of either similar or dissimilar materials, for the purpose of achieving greater strength than achieved with conventional methods, while limiting the build-up of plastisized matter around the peripheral edge of the rotatable workpiece in an operation comprising a burnoff, upset, forging, fusing and apparatus removal phases, said apparatus comprising:

an engagement means for engagement with a chuck of said friction welding machines to permit holding of said friction welding fusion enhancer apparatus during said burnoff, upset, forging, and fusing phases;

a reaction surface area greater than said rotatable workpiece is made part of said friction welding fusion enhancer apparatus and further said reaction surface area is located axially 180 degrees from said rotatable workpiece engagement end and further said reaction surface area is removable;

an integral geometry can comprise said friction welding fusion enhancer apparatus and further said integral geometry includes said engagement means, said reaction surface area and a break-a-way or burn-a-way removable section after completion of said burnoff, upset, forging, and fusing phases after removal of said apparatus from said chuck;

a componentized configuration comprising said engagement means, an attachment holding mechanism and said reaction surface area that is removable from said chuck, after completion of said burnoff, upset, forging, and fusing phases; and said friction welding, fusion enhancer apparatus reaction surface area provides for extending the heat past the outer diameter of said rotatable workpiece and further permits the fusion bonding of a greater area of said rotatable workpiece by extending plastisizing of materials, which would not occur without said friction welding fusion enhancer apparatus and further said reaction area can be held in place with an attachment holding mechanism during said burnoff, upset, forging, and fusing phases.

10. The apparatus of claim 9, wherein said friction welding fusion enhancer apparatus engagement means can be used to hold attached said rotatable workpiece in said chuck by means of a threaded arrangement or a locking or a press fit.

11. The apparatus of claim 9, wherein said friction welding fusion enhancer apparatus can be of various geometric configurations fabricated integral to said rotatable workpiece.

12. The apparatus of claim 11, wherein said integral friction welding fusion enhancer apparatus said reaction surface area can be made to break-a-way or burn-a-way from said rotatable workpiece after said burnoff, upset, forging, and fusing phases.

13. The apparatus of claim 9, wherein said friction welding fusion enhancer apparatus reaction surface area can be of various geometric configurations and further and said reaction surface area can be smooth, rough or made of dissimilar materials.

14. The apparatus of claim 9, wherein said friction welding fusion enhancer apparatus can be comprised of components and further such components can include a rotatable friction welding fitting with said attachment means, a reaction surface area section that is removable after said burnoff, upset, forging, and fusing phases.

15. The apparatus of claim 14, wherein said rotatable friction welding fitting engagement means can be used to hold attached said rotatable workpiece in said chuck by means of a threaded arrangement or a locking or a press fit.

16. The apparatus of claim 15, wherein said rotatable friction welding fitting said reaction surface area section is removable and further said reaction surface area section can be attached to said rotatable friction welding fitting and can be installed by slip-on or threaded means.

17. The apparatus of claim 16, wherein said rotatable friction welding fitting said reaction surface area section is held firmly in place during said burnoff, upset, forging, and fusing phases by means of a threaded back-up fastener or set screw.

18. The apparatus of claim 9, wherein said friction welding fusion enhancer apparatus can be fabricated from similar or dissimilar materials to said rotatable workpiece and further can be made of one or more components.

* * * * *